(No Model.)   2 Sheets—Sheet 1.
J. J. PADDEN.
Brake Lever.
No. 232,410.   Patented Sept. 21, 1880.
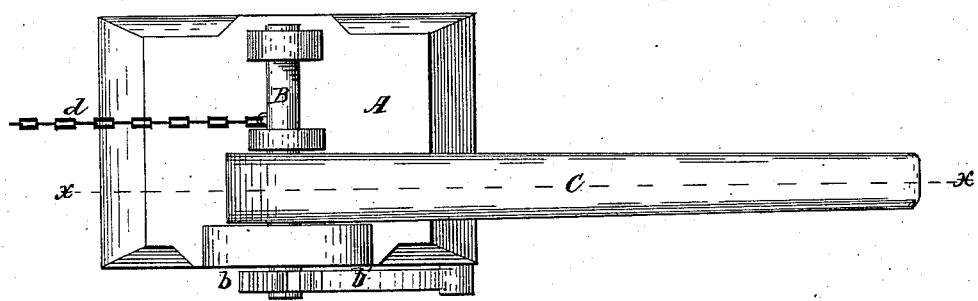
Fig 1
Fig 2
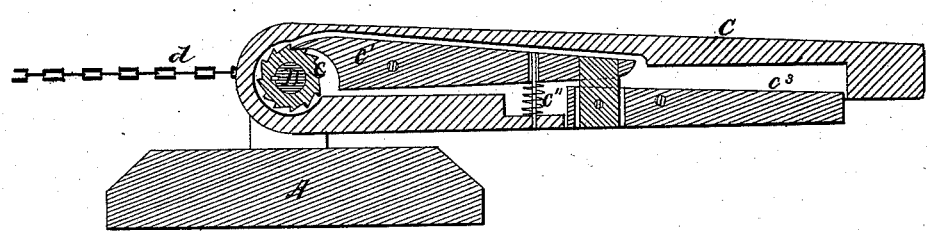
Fig 3
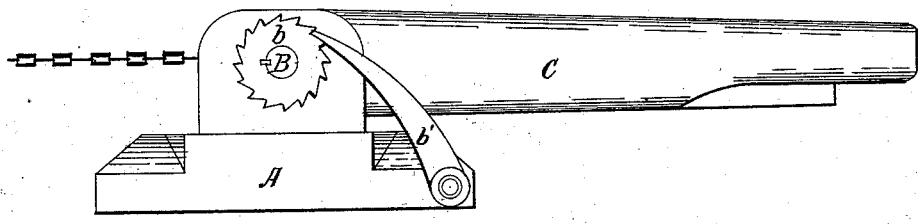
Witnesses
W. C. Corliss
H. M. Price
Inventor
John J. Padden
By Dixon & Smith
Attorneys (No Model.)  
J. J. PADDEN.  
Brake Lever.  
2 Sheets—Sheet 2.
No. 232,410. Patented Sept. 21, 1880.
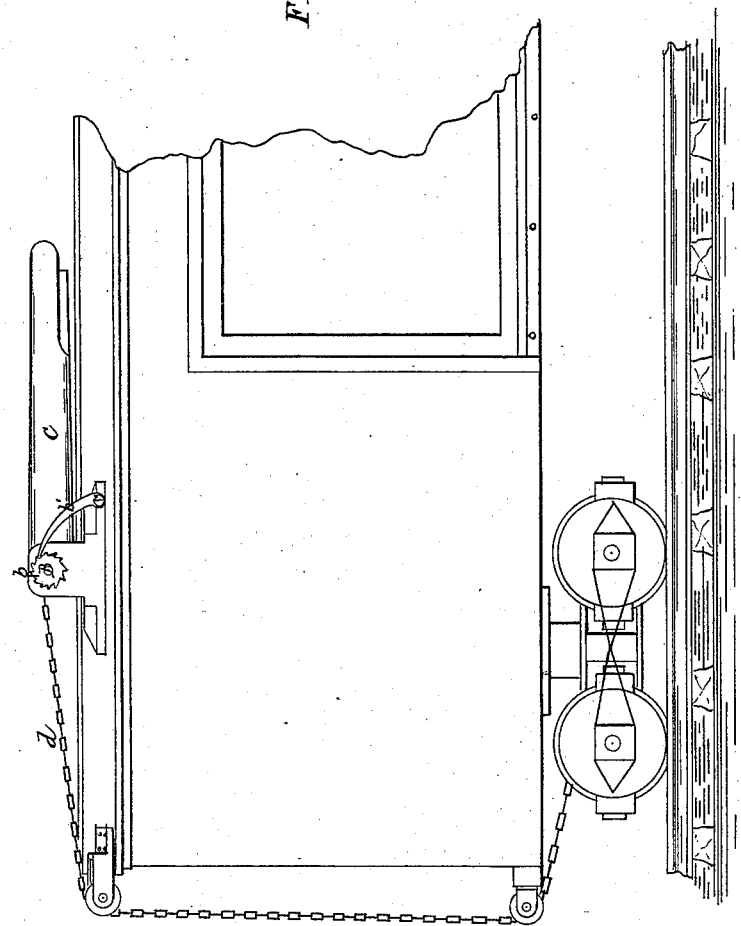
Witnesses  
Inventor  
John J. Padden  
By Dyer & Smith  
Attorneys

UNITED STATES PATENT OFFICE.

JOHN J. PADDEN, OF CHICAGO, ILLINOIS, ASSIGNOR OF ONE-HALF OF HIS RIGHT TO JAMES P. PADDEN, OF SAME PLACE.

BRAKE-LEVER.

SPECIFICATION forming part of Letters Patent No. 232,410, dated September 21, 1880.

Application filed April 12, 1880. (No model.)

*To all whom it may concern:*

Be it known that I, JOHN J. PADDEN, of Chicago, Illinois, have invented a new and useful Improvement in Brake-Levers, of which the following is a specification.

The device is illustrated in detail in the accompanying drawings.

Figure 1 is a top view of the lever. Fig. 2 is a longitudinal vertical section. Fig. 3 is a side view, and Fig. 4 is a view showing the mode of attachment to a car and method of operation.

The invention is designed to be used in combination with the ordinary car-brake, and relates to the mode of applying the brake to the wheels of the car, as will be fully understood from the following detailed description.

Similar letters indicate similar parts in the different figures.

B is a shaft set so as to turn freely in its bearings in the frame A, having at one of its outer extremities a ratchet-wheel, $b$, which is operated upon by the pawl $b'$, thus preventing the unwinding of the brake-chain, which is wound upon the shaft.

C is a lever, hollowed so as to contain certain mechanism, through the lower end of which lever the shaft B passes, and is so adjusted as to turn freely. Upon the shaft B, and within the lever C, is a second ratchet-wheel, $c$, operated by the pawl $c'$, which is pivoted inside and to the lever C, and by the operation of the spring $c''$ is pressed against the ratchet, from which it can be raised by pressing upon the small lever $c'''$ in the lower side of the handle portion of the lever C.

The brake-chain $d$ is fixed to wind upon the shaft B, and passes from thence to the brake at the bottom of the car, running over sheaves fixed at the corners of the car, as shown in Fig. 4.

In operation the device is attached to the top of a car at any desired distance from the end of the same. When it is desired to apply the brake the lever C is raised, and by the operation of the pawl $c'$ upon the ratchet $c$ the shaft B is caused to turn, thus winding the brake-chain upon it and tightening the brake.

The shaft B being held by the ratchet $b$ and pawl $b'$, the lever C can be lowered preparatory to another turn of the shaft, the pawl $c'$ slipping upon the ratchet and allowing the lever to turn upon the shaft, when the lever can be again raised to give the shaft another turn, and this process is repeated until the brake is set as rigidly as desired.

When it is desired to loosen the brake the lever C is raised sufficiently to allow the pawl $b'$ to be removed from the ratchet, and the tension caused by the brake-chain upon the shaft is thus transmitted through the ratchet $c$ and pawl $c'$ to and wholly sustained by the lever C, when by pressing upon the small lever $c'''$ the pawl $c'$ is drawn from its ratchet, which being now entirely released from restraint allows the shaft B to turn freely in its bearings and the chain to unwind.

It will be apparent that, if desired, the lever C can be adjusted so that the shaft shall be turned by its downward instead of its upward movement, care being taken that it shall be constructed so that the openings shall be in its lower side, thus protecting the inclosed mechanism from rain or snow.

Among the advantages of this brake-lever is that of its being placed at a distance from the end of the car, thus preventing the exposure of the person operating it to danger in case of the breaking of the brake-chain or other portion of the brake to which he is exposed by such an accident with the brake now in ordinary use, and also the increased power which, by its use, can be applied to the brake.

What I claim as new, and desire to secure by Letters Patent, is—

In a brake-lever, the hollow lever C, provided with the pawl $c'$, small lever $c'''$, and spring $c''$, all contained within the lever C, in combination with the shaft B, provided with the ratchet $c$ inside the lever C, and the ratchet $b$, with its pawl $b'$, substantially as and for the purposes set forth.

JOHN J. PADDEN.

Witnesses:
T. S. E. DIXON,
PLINY B. SMITH.